Figure 1:
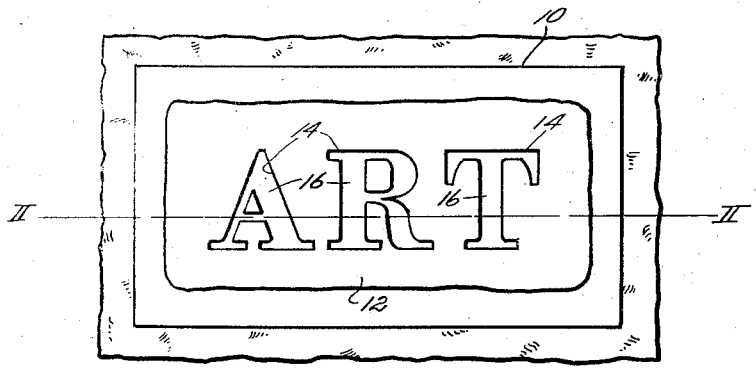

Jan. 19, 1937.　　C. E. CLEVELAND ET AL　　2,068,483
METHOD OF COLORING STONE

Filed Dec. 16, 1935

INVENTOR,
Clarence E. Cleveland.
Vincent E. Peterson.
BY
ATTORNEYS.

Patented Jan. 19, 1937

2,068,483

UNITED STATES PATENT OFFICE 2,068,483

METHOD OF COLORING STONE

Clarence E. Cleveland and Vincent E. Peterson, Salina, Kans.

Application December 16, 1935, Serial No. 54,668

5 Claims. (Cl. 41—29)

This invention relates to the process of coloring marble, limestone, cement and other absorbent, natural or manufactured building or monumental material containing calcium, and hereafter designated as stone, and particularly to a process whereby the coloring of the material is produced to a sufficient depth in the stone to insure a lasting coloring and to a definitely determined area.

The present methods of coloring designated portions of marble or other calcareous stones is by the application of a coloring material to the surface thereof, which at best is of relatively short duration. Any permanent stain or dye that might be applied to the stone that would penetrate the desired depth to cause a permanent coloring would, because of capillary attraction, also color the surface of the stone adjacent the design to be colored, thus causing a ragged effect which would be very objectionable.

The present invention overcomes the above objections and produces a clean cut outline of the designs colored and at the same time gives a depth of coloring that will insure a colored design even though the stone is eroded to a marked degree.

One of the principal objects of the present invention is the process of coloring marble, etc., which includes hermetically sealing the surface of the marble adjacent the designs to be colored, then applying a fluid coloring matter to the design and permitting it to penetrate the stone to produce a sharp outlined design that will remain so as long as the stone is not worn away below the depth of penetration of the coloring matter.

In order to produce the proper coloring of the stone, it has been found desirable to use an inorganic chemical that reacts with the stone to form a permanent color within the body thereof and also tends to harden the surface of the stone, thereby making it substantially impervious to the natural weathering elements and preserving the stone for a longer period of time.

The reactive solutions best suited for coloring the stone consist of silico-fluorides of various metals such as iron, chromium, copper, cobalt, etc., which react with the different forms of calcium of the stone to form permanent oxides or carbonates of determinable colors dispersed within the body of the stone.

More definitely, the coloring solution consists of a soluble filtrate resulting from the complete interaction of hydrofluosilicic acid, water and various metallic oxides, hydroxides, carbonates, or other suitable salts.

The exact properties of the solution, such as its penetrability, intensity of color, etc., depend to a marked degree upon the proportions of the ingredients, order and amount when combining, completeness of neutralization, whether heated and to what degree, etc. These solutions react with the calcium carbonate of the stone. It is thought that this reaction gives calcium fluosilicate and the colored insoluble oxides and/or carbonates of the particular metal in dispersed form.

It is one of the chief values of this method of coloring the stone that a coloring solution is used that will penetrate the stone and produce therein a permanent color. However, the use of this penetrating material without proper confinement to the predetermined areas would be impracticable because of its tendency to creep or spread to those portions of the stone adjacent the design to be colored, thereby preventing a definite demarkation of the design.

In order to overcome this creeping of the coloring solution, I have conceived the idea of sealing all portions of the stone adjacent the designs to be colored. This is accomplished by applying to the surface of the stone a material that will penetrate all surface pores, thereby hermetically sealing said surface and completely stopping the capillary attraction tending to pull the fluosilicates into the surface of the stone about the design.

"Dope", the name given to gelatin compound commonly used in the stone industry for masking, etc., has been found to be suitable for use in sealing the surface of the stone.

This method is applicable for use where the designs are incised, reliefed or carved, or combinations, the only requisite being that the surface of the stone forming the design be so treated as to open the pores sufficiently to permit proper penetration of the coloring liquid. Sand blasting has been found most satisfactory due to the fact that it thoroughly opens the pores of the stone.

Figure 2:
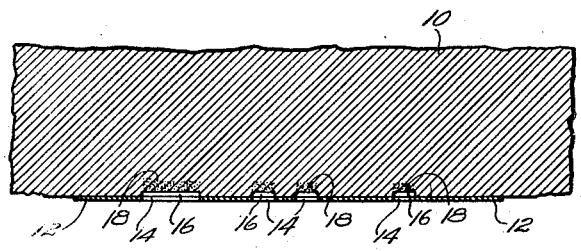

Reference will now be had to the accompanying drawing, wherein:

Figure 1 is an elevational view of a stone having a design formed thereon in accordance with this invention, and Fig. 2 is a sectional view taken on line II—II of Fig. 1.

The preferred method of carrying out this invention is as follows: The surface of the stone 10 to be decorated by colored designs is covered with a liquid gelatin composition 12. This covering is permitted to congeal to a solid state to form a mask over said surface, thereby hermetically sealing the same.

The desired designs 14 to be colored are cut from the mask, thus exposing the surface of the stone. The exposed surface of the stone is then cut away as at 16 to the desired depth by a sand blast. After the sand blasting is completed and the remaining portions of the mask still in position, the stone is positioned with the decorated surface in a horizontal position, a fluosilicate of metal solution is deposited on the sand blasted designs and permitted to penetrate the stone to the desired depth. After the reaction set up in the stone is completed and the surface of the stone is freed from the coloring solution by washing or otherwise, the remaining masking material is removed in the usual manner and the entire surface washed.

It will be found that the coloring solution has not entered the stone surface adjacent the design and that there are no coloring stains adjacent the predetermined colored areas. A definite and distinct line of demarkation between the masked portions and the design will be obtained, and the coloring will extend into the stone at substantially perpendicular relation to the surface of the stone. Some stones colored by this process have been colored to a depth of more than one-fourth inch.

It is thought that when the fluosilicate of iron, or of other metals, impregnates the stone, that the carbon dioxide of the calcareous stone is released and replaced by fluosilic acid and that the salts formed by this reaction are insoluble, producing the desired coloring of the stone to great depth. Not only is the stone colored, but the process also produces a hard layer 18 over the entire design surface which makes it more impervious to destructive elements.

Many other mask materials might be used; furthermore, the design might be otherwise engraved or produced in relief without material changes in the method.

As stated above, fluosilicates of different minerals might be used to obtain the desired colorings, also, it has been found that combinations of these coloring solutions may be used to obtain effects not otherwise obtainable.

It is important to note that the sealing or masking material must be of such nature that it will completely close the surface pores of stone to prevent creeping of the coloring solution. It has been found that the ordinary rubber stencil or "jiffy" gelatin stencils when used in this method will not close the pores and consequently will not prevent creeping.

In certain instances it is impractical to position the stone horizontally during the coloring process. This is true where the stones are in position in building structures, etc. In such cases, the liquid coloring material is deposited on the design by means of a brush or similar instrument, and it will be found desirable to make more than one application of the coloring solution in order to obtain the proper depth of penetration. When the different coats are applied, it has been found best to permit each coat to dry before applying the next coat.

Many minor changes might be made in the different steps of this method without departing from the spirit of the invention.

What we claim is:

1. A process of coloring calcareous stone which consists in hermetically sealing the surface portion of the stone about restricted areas to be colored; cutting away the surface of said restricted areas; and applying fluosilicate of metal to said restricted areas whereby the stone therebeneath is impregnated.

2. A process of coloring calcareous stone, which consists in hermetically sealing that portion of the stone adjacent its surface; cutting designs in said sealed surface; and applying fluosilicate of metal to said cut design whereby the stone therebeneath is impregnated and colored.

3. The method of coloring calcareous stone, comprising coating the surface of the stone with a layer of liquid gelatin and permitting it to penetrate into the pores of the stone and congeal to a solid state to hermetically seal said surface; removing a portion of said layer of gelatin to expose a portion of the surface of the stone corresponding to the desired design; cutting into said exposed surface of the stone to the desired depth; and applying fluosilicate to the exposed cut surface of the stone.

4. The method of coloring calcareous solids, consisting in coating a portion of the surface of said solid with a material to fill the surface pores and to form an air-tight mask thereover; cutting a design from said mask, thereby exposing the surface of the solid corresponding to said design; sand blasting said design to cut away said solid to a desired depth; and applying a fluosilicate of metal to said etched design to impregnate the solid beneath said design.

5. The method of coloring calcareous stone consisting in coating a surface with a material to fill the surface pores and produce a hermetical mask thereover; cutting a design from said mask to expose the surface of said stone; sand blasting said design to cut away said stone to a desired depth; applying fluosilicate of a metal to said design to impregnate the stone therebeneath; and removing the remaining masking material from said surface.

CLARENCE E. CLEVELAND.
VINCENT E. PETERSON.